United States Patent [19]
Arnoux

[11] 3,968,406
[45] July 6, 1976

[54] DIRECT CURRENT ELECTROMAGNETIC ASSEMBLY OPERATING ON ALTERNATING-CURRENT MAINS

[75] Inventor: Daniel Arnoux, Paris, France

[73] Assignee: Chauvin Arnoux, Paris, France

[22] Filed: Jan. 20, 1975

[21] Appl. No.: 542,093

[30] Foreign Application Priority Data

Jan. 21, 1974 France ............................ 74.01963

[52] U.S. Cl. .......................... 317/14 B; 317/155.5; 317/DIG. 6; 321/47
[51] Int. Cl.[2] ........................................ H02H 7/04
[58] Field of Search ........................... 307/317, 318; 317/DIG. 4, DIG. 6, 13 A, 14 B, 154, 155, 155.5; 321/8 R, 47

[56] References Cited

UNITED STATES PATENTS 3,154,725 10/1964 Kadah ......................... 317/155.5 X
3,172,019 3/1965 Ragonese ...................... 317/DIG. 4
3,331,992 7/1967 Walker ............................. 307/318

FOREIGN PATENTS OR APPLICATIONS 15,569 3/1956 Germany ........................... 317/156
182,773 8/1955 Germany .............................. 317/52
553,939 7/1932 Germany ........................... 317/156

*Primary Examiner*—William M. Shoop

[57] ABSTRACT

This d.c. electromagnet having a rectifying device designed for operating from an a.c. mains utilizes a pair of diodes. The winding structure comprises a first winding supplied through a first diode and a second winding which, in conjunction with said first winding and a second diode, constitutes a loop circuit, the arrangement being such that any surge-voltage applied to any one of the two diodes is applied through at least one of the first and second windings, whereby the diodes are protected against such surge-voltages.

5 Claims, 2 Drawing Figures

DIRECT CURRENT ELECTROMAGNETIC ASSEMBLY OPERATING ON ALTERNATING-CURRENT MAINS

FIELD OF THE INVENTION

The present invention relates to a diode rectifying device designed for supplying d.c. to a d.c. electromagnet from an a.c. source or mains. This invention is applicable in general to relays and contactors.

The rectified energization of an electromagnet is frequently preferred to a direct a.c. supply with a Fragerturn (Shaded Pole) in the magnetic gap, in order to improve the efficiency of the controlled device. Thus, more particularly, it is possible to insert a thin film of plastic material such as "Rilsan" into the air gap of an electromagnet supplied with d.c. or rectified current, as already disclosed in the French Patent No. 1,270,288 delivered to the same Applicant.

DESCRIPTION OF THE PRIOR ART

A first known rectifying device comprises a four-diode bridge, one diagonal of the bridge being fed from the mains, the other diagonal energizing the electromagnet coil.

In another known device the electromagnet coil comprises a pair of windings having a common point, and only one or the other winding is energized at a time through a respective one of two diodes so connected to the respective windings as to conduct current in opposite directions.

In a third known arrangement, two diodes and a single winding are used, with one diode energizing the winding during a first half-wave of the mains voltage and the other diode connected in the reverse direction to the winding terminals, so as to form a loop allowing a self-induction current to flow therein and to decrease gradually during the other half-wave of the mains voltage down to a current value higher than the holding current of the electromagnet.

This third known arrangement utilizes a winding wire which is larger in diameter than the other known device, and it is therefore less fragile and cheaper than the first device.

In fact, instead of being limited only by the coil resistance, the current is also limited at least partly by the impedance due to periodic variations of the flux level in the magnetic circuit.

A fourth known device comprises a single diode connected in series with the winding, and a short-circuited ring surrounding the complete core section, so as to retard the flux reduction during the halve-wave of the mains voltage in which the winding is not energized.

However, all the devices briefly mentioned hereinabove suffer from particular drawbacks:

The first device is expensive for it requires the use of four diodes, a thin and therefore fragile wire, and a more elaborate support system.

The second device has a poor efficiency for it amounts to utilize only one-half at a time of the whole winding in comparison with the first device; now, within certain limits, the power consumption is inversely proportional to the winding volume.

In the fourth device, the ring counteracts both the increment and the decrease of the magnetic flux, thus increasing the pick-up voltage and therefore the power consumption.

Moreover, the relatively small volume of this ring causes the flux decrease time constant to be relatively low, thus making it necessary to have a low reluctance in the magnetic circuit under closed-circuit conditions, for example by eliminating the residual gap.

Consequently, certain drawbacks of the above-mentioned systems utilizing an a.c. supply with a Frager turn are also found in this fourth device.

The first and third devices are detrimentally affected by surges-voltages; experience teaches that, even with controlled avalanche diodes, voltages surges caused by industrial plants may destroy the diodes, especially if steep surge-voltage fronts are produced. In fact, in this case there is no time for the avalanche to develop throughout the junction surface area, and the energy is concentrated at one point of said junction. Under these conditions the reverse current may rise very rapidly to excessive values. Now the recent developments of power electronic circuits tend to create surge-voltages having a steeper wavefront than those caused by the opening of contacts inserted in inductive circuits.

On the other hand, experience teaches that the second and fourth devices have a good resistance to steep-wavefront over-voltages, due to the reactance inserted in the reverse circuit of the diode. The over-voltage appears across the reactance voltage and the reverse current increases slowly, so that there is enough time for the avalanche to develop in the diode, thereby preventing its destruction.

Protection systems against over-voltages are already known which utilize for example discharge tubes, or quick-response metal-oxide varistors (operating within a few nano-seconds). However, these systems are relatively expensive especially when it is contemplated to insert them in a article of relatively low unitary value, such as a relay.

In the third device, the winding must meet requirements that may be contradictory.

In fact, during the half-wave of the mains voltage during which a self-induction current flows through the winding and the second diode, the time constant of the winding must be long enough to prevent the flux from decreasing too much, with due consideration if necessary for the plastic film disposed in the magnetic gap. However, during the other half wave of the mains voltage, i.e. the direct feed half-wave, in the neighborhood of the minimum pick-up voltage the operation must be quick enough, so that the armature movement can start before the end of this half-wave (10 ms in the case of a 50-Herz current). Thus, the air-gap will be less wide when the next direct-feed half-wave appears. To meet this requirement, it may be necessary to reduce the time constant of the winding.

In fact, it is possible to demonstrate that the minimum starting time of a d.c., constant-power electromagnet is obtained when the attraction force under open-circuit conditions and in a steady state is equal to twice the antagonistic resistant force. An increase in the attraction force, by increasing the time constant, will develop a higher force, but the latter will appear too late. It is therefore necessary to reduce the time constant until the attraction force be equal to twice the resistant force. The time constant can be reduced very simply with a smaller winding volume.

It is therefore the essential object of the present invention to improve the operation of a system based on the third, known device set forth hereinabove, by imparting thereto the properties of resistance to surge-voltages which characterise the second and fourth devices, while preserving the advantages of the plastic film inserted in the air-gap and simplifying its construction.

SUMMARY OF THE INVENTION

According to this invention, the apparatus comprises a pair of rectifying diodes, preferably of the avalanche type, supplying an electromagnet of the d.c. type with d.c. from an a.c. mains, one of said diodes being adapted to supply current to the electromagnet winding only during one half-wave of the mains voltage, the other diode enabling a self-induction current to loop and decrease gradually during the other half wave to a current value which remains higher than the holding current of the electromagnet.

This invention is characterised in that the electromagnet coil comprises two windings the winding or group of windings used for the d.c. supply of the electromagnet through one diode being different from the winding or group of windings used for allowing the self-induction current to loop through the other diode, whereby if a surge-voltage in the supply mains is applied to anyone of the two diodes in the reverse direction the current resulting from such an surge-voltage must also flow through at least one of the coil windings, thus ensuring a reliable protection against surge-voltages even if they are of the steep wavefront type.

According to a preferred embodiment of the present invention, the direct supply is applied to only one winding, and the self-induction current loops through both windings connected in series, so as to reduce as requested the time constant of the direct supply.

According to an advantageous embodiment of the device of this invention, the two windings are superposed concentrically on a same coil frame, with the central or inner winding of the coil connected to the supply mains through one of the two diodes and the external or outer winding connected with the second diode for allowing the self-induction current to loop therethrough. The same wire diameter may be used without break for making both windings, in order to simplify their manufacture on an automatic winding machine.

According to a preferred practical embodiment, one flange of the coil yoke comprises two slots for allowing the passage therethrough, to the outside of the frame, of the inner end and the intermediate tap of the coil wire, respectively, said flange having also four spades partly embedded in the thickness of said flange. The two diodes, the ends of the two windings and also two supply wires from the mains may if desired be connected directly, by welding, to these connectors. Thus, any intermediate supports and connections are safely avoided and the coil with its rectifying means constitute a unitary, compact assembly.

Other features and advantages of the invention will appear as the following description proceeds with reference to the attached drawing.

DESCRIPTION OF THE PREFERRED EMBODIMENT

Figure 1:
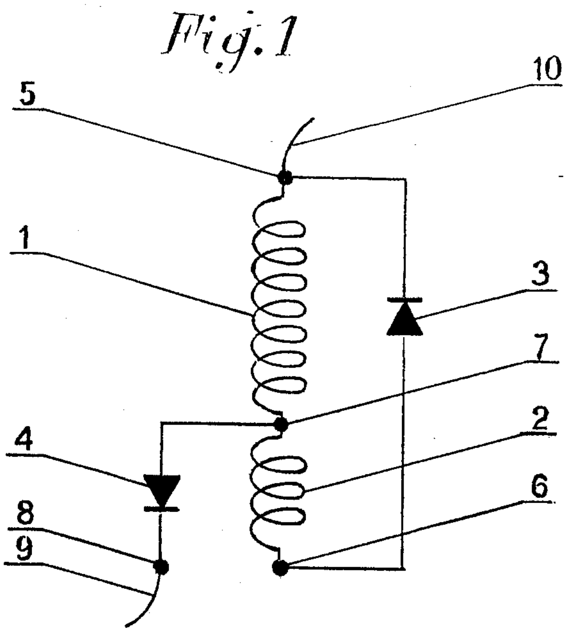
FIG. 1 is a wiring diagram of a device according to one embodiment of the invention.

As illustrated in FIG. 1, the device comprises a first winding connected in series with a second winding 2, a first diode 3 and a second diode 4, preferably of the avalanche type. The first diode 3 is connected across the terminals 5 and 6 of the series connected windings 1, 2, and the second diode 4 is connected between the intermediate terminal or tap 7 of said windings and another terminal 8 to which one of the supply wires 9 is also connected. These diodes 3, 4 are so disposed that their electrodes of the same polarity are connected to terminals 5 and 8 respectively.

Figure 2:
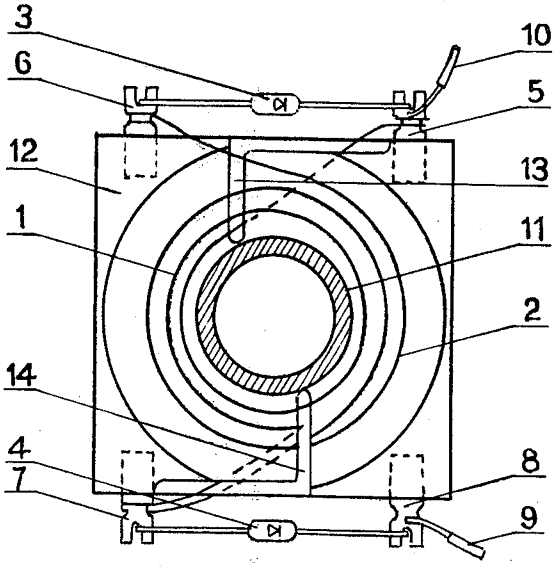
FIG. 2 is a fragmentary diagrammatic section taken across the coil frame according to a typical embodiment of this invention.

The same components are illustrated in FIG. 2, but here the windings 1 and 2 are shown only diagrammatically, with winding 1 disposed centrally of the coil. The core of the coil frame 11 is shown in cross-section and one of the end flange 12 is shown as supporting the terminals 5, 6, 7 and 8 actually consisting of spades partly embedded in the flange material. A pair of slots 13, 14 are formed for preventing in the conventional manner any direct contact between the inner end of the coil wire and the next turn layer of the winding and for allowing the exit of said inner end and of the intermediate tap. The wire ends are wound on spades 5, 6 and 7. Spades 6 and 8 are welded before spades 5 and 8, so that the diodes 3 and 4 are safely held in position during the welding of wires 9 and 10.

The above-described assembly operates as follows:

When a positive half-wave of the mains boltage is present at terminal 5, a current flows through winding 1 and through diode 4 in the forward direction. The electromagnet armature begins to move. When the potential becomes negative at terminal 5, i.e. during the next negative half-wave, the same diode 4 cease to conduct. However, the current previously circulating in winding 1 finds a path to form a loop in winding 2 and diode 3, and it tends to remain constant. It keeps the armature substantially in its preceding position. The following positive half wave will complete the armature stroke in case the latter had not been completed from the very first half-wave.

By properly selecting the intermediate tap 7 between the two windings, i.e. the ratio of the turns numbers of these series-connected windings, it is possible to minimize the response time of the armature. Since the self-induction current appearing during each negative half-wave flows through the complete coil circuit means for neutralizing the residual magnetism, for example in the form of a thin film of plastic material inserted in the air gap, may be used.

The winding 1 acting as a starting winding is disposed centrally of the coil for in this position it is less sensitive to leakage flux under open magnetic circuit conditions.

The external winding having a moderate efficiency during the initial or starting phase if the electromagnet armature, but having a decreasing leakage flux when the magnetic circuit is closed, is utilized as winding 2, thus improving the looping effect.

With this arrangement, the power necessary for operating the electromagnet with an a.c. supply may be less than that required for a d.c. operation.

Should a positive surge-voltage appear at terminal 8, it would strike the diode 4 in the reverse direction but the reverse current from this diode must flow either through winding 2 and diode 3, or through winding 1. As a result, the surge-voltage is applied across the terminals of these winding, whereas the diode 4 has only applied thereto its own avalanche voltage across its terminals.

On the other hand, should a positive surge-voltage develop at terminal 5, one fraction of the surge-voltage energy would flow through iwinding 1 and diode 4, while the remaining fraction would flow through the avalanche of diode 3 protected by the series-connected winding 2.

Of course, it would not constitute a departure from the basic principles of this invention to bring thereto various modifications and changes not liable to affect the structure of the device, for instance by reversing the direction of flow of the two diodes or inserting the diode 4 between the supply wire 10 and terminal 5.

The device according to this invention may be applied to all electromagnets for which only an alternating-current supply is available, and in such cases where the performances of d.c.-type magnetic circuits are desirable. This device is particularly adapted for controlling relays and contactors in industrial areas where surge-voltages are frequently observed.

What is claimed as new is:

1. An electromagnet of the direct-current type having rectifying means for supplying direct-current thereto from a source of alternating current, which comprises a first winding, a first diode mounted in series with said first winding, the series circuit consisting of said first winding and said first diode being connectable across an external source of alternating current for the direct feed of said electromagnet during one half-wave of the alternating current, a second winding and a second diode mounted in series with said second winding, said first and second windings being made of the same wire wound in the same direction without any break, the series circuit consisting of said second winding and second diode being connected across the terminals of said first winding for allowing a self-induction current to loop through said second winding, said second diode and said first winding, during the other half-wave of said alternating current, whereby a current due to a surge-voltage in said alternating current source and flowing through anyone of said two diodes in the reverse direction is forcibly caused to flow likewise through at least one of said first and second windings.

2. Electromagnet as set forth in claim 1, wherein said two diodes are of the avalanche type.

3. Electromagnet as set forth in claim 1, wherein said first and second windings are wound on a common coil frame, and said second winding is disposed concentrically around said first winding.

4. Electromagnet as set forth in claim 3, wherein the ratio of the number of turns of the first winding to the number of turns of the second winding is so selected that the response time of the electromagnet is minimized.

5. Electromagnet as set forth in claim 3, wherein the coil frame comprise at least one flange in which slots are formed for the passage of the winding ends, said electromagnet further comprising four spades secured to said flange and having said winding ends, the electrodes of said diodes and the supply wires from said alternating current source welded thereto.

* * * * *